United States Patent
Kim et al.

(10) Patent No.: US 10,069,129 B2
(45) Date of Patent: Sep. 4, 2018

(54) BATTERY MODULE COMPRISING CONNECTING MEMBER COMPOSED OF DISSIMILAR METALS

(71) Applicant: LG CHEM, LTD., Seoul (KR)

(72) Inventors: Tae Su Kim, Daejeon (KR); Sang Yoon Jeong, Daejeon (KR); Jung Mo Kim, Daejeon (KR); Han Sik Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 273 days.

(21) Appl. No.: 14/762,774

(22) PCT Filed: Jul. 4, 2014

(86) PCT No.: PCT/KR2014/005992
§ 371 (c)(1),
(2) Date: Jul. 22, 2015

(87) PCT Pub. No.: WO2015/002495
PCT Pub. Date: Jan. 8, 2015

(65) Prior Publication Data
US 2016/0141583 A1    May 19, 2016

(30) Foreign Application Priority Data
Jul. 5, 2013 (KR) ................. 10-2013-0079240

(51) Int. Cl.
*H01M 2/20* (2006.01)
*H01M 2/02* (2006.01)
*H01M 2/30* (2006.01)

(52) U.S. Cl.
CPC ......... *H01M 2/202* (2013.01); *H01M 2/0285* (2013.01); *H01M 2/0287* (2013.01);
(Continued)

(58) Field of Classification Search
None
See application file for complete search history.

(56) References Cited

U.S. PATENT DOCUMENTS

| | | | | |
|---|---|---|---|---|
| 7,714,230 B2 * | 5/2010 | Beulque | ................. | H02G 5/005 174/117 A |
| 8,801,444 B2 * | 8/2014 | Sakae | ................... | H01M 2/206 429/211 |

(Continued)

FOREIGN PATENT DOCUMENTS

| | | |
|---|---|---|
| CN | 102779967 A | 11/2012 |
| CN | 102870254 A | 1/2013 |

(Continued)

*Primary Examiner* — Rena Dye Cronin
(74) *Attorney, Agent, or Firm* — Dentons US LLP

(57) ABSTRACT

Disclosed herein is a battery module including battery cells, electrode terminals of which are electrically connected to each other via a connecting member, wherein each of the battery cells is configured to have a structure in which an electrode assembly is mounted in a battery case made of a laminate sheet including a metal layer and a resin layer, and plate-shaped electrode terminals protrude from the battery case, the electrode terminals include a first electrode terminal and a second electrode terminal made of dissimilar metals, the connecting member includes a main connecting part, to which the first electrode terminal is welded, the main connecting part including the metal of the first electrode terminal, and a buried connecting part, to which the second electrode terminal is welded, the buried connecting part including the metal of the second electrode terminal, the buried connecting part is buried in the main connecting part in a state in which the buried connecting part is exposed at one surface of the main connecting part such that the buried connecting part has the same height as the main connecting part to form an even surface, and the first electrode terminal and the second electrode terminal are welded respectively to (Continued)

the main connecting part and the buried connecting part at one surface of the main connecting part at which the buried connecting part is exposed.

13 Claims, 3 Drawing Sheets

(52) U.S. Cl.
CPC ........... *H01M 2/204* (2013.01); *H01M 2/206* (2013.01); *H01M 2/30* (2013.01); *H01M 2220/20* (2013.01); *H01M 2220/30* (2013.01)

(56) References Cited

U.S. PATENT DOCUMENTS

| | | | | |
|---|---|---|---|---|
| 2010/0047685 A1* | 2/2010 | Lee | ........................ | H01M 2/021 429/176 |
| 2010/0143787 A1* | 6/2010 | Jung | ..................... | H01M 2/021 429/162 |
| 2012/0288743 A1* | 11/2012 | McLaughlin | ......... | H01M 2/206 429/158 |
| 2013/0012079 A1* | 1/2013 | Sakae | ................... | H01M 2/206 439/884 |
| 2013/0130572 A1* | 5/2013 | Sakae | ................... | H01M 2/206 439/884 |
| 2013/0189560 A1* | 7/2013 | Widhalm | .............. | H01M 2/206 429/121 |

FOREIGN PATENT DOCUMENTS

| | | |
|---|---|---|
| EP | 2372814 A2 | 10/2011 |
| EP | 2581966 A1 | 4/2013 |
| JP | 04-123757 A | 4/1992 |
| JP | 2006261083 A | 9/2006 |
| JP | 2011-210482 A | 10/2011 |
| KR | 10-2006-0097445 A | 9/2006 |
| KR | 10-2010-0019004 A | 2/2010 |
| KR | 10-2011-0109779 A | 10/2011 |
| KR | 10-2013-0012547 A | 2/2013 |
| KR | 10-2013-0016423 A | 2/2013 |
| WO | 2012/165567 A1 | 12/2012 |

* cited by examiner

【FIG. 1】
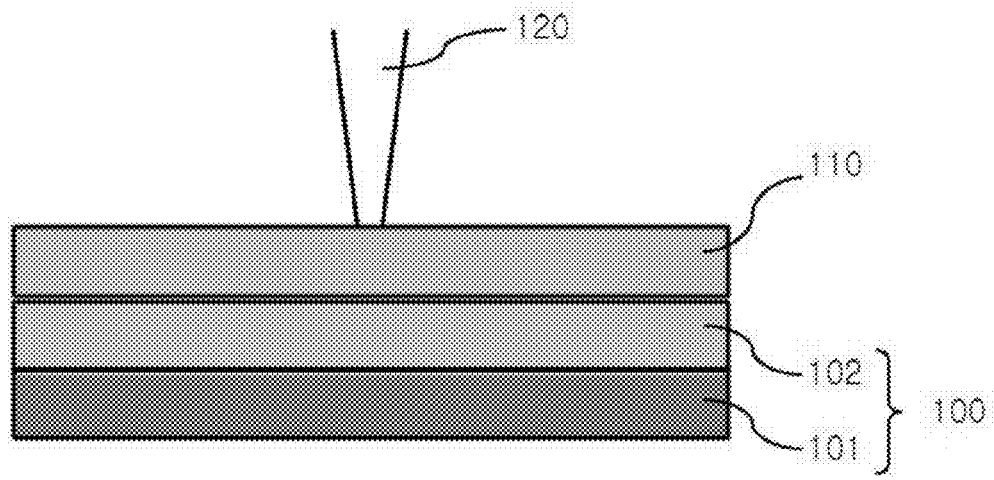
【FIG. 2】
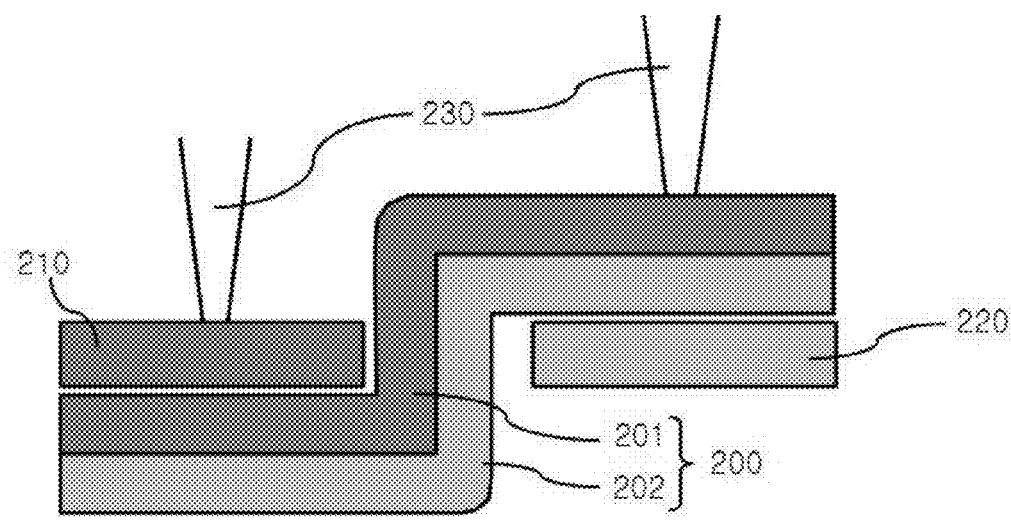

[FIG. 3]
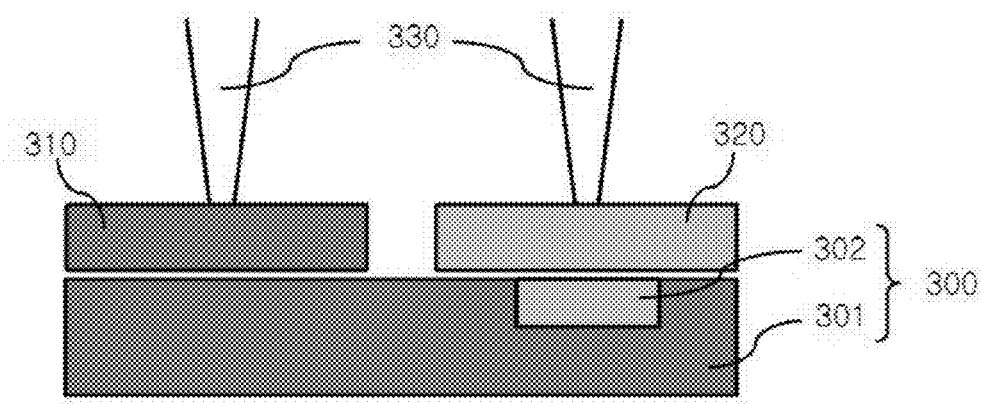
[FIG. 4]
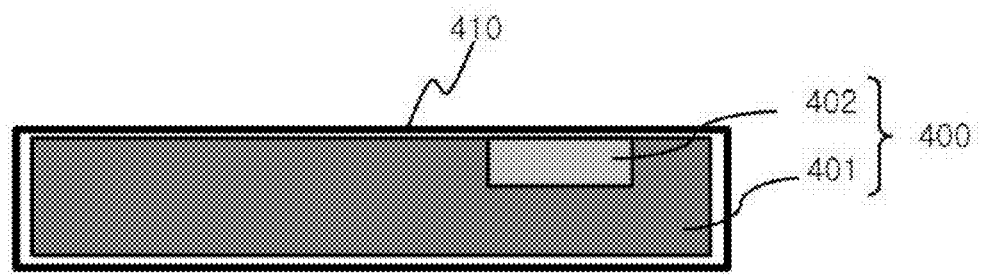
[FIG. 5]
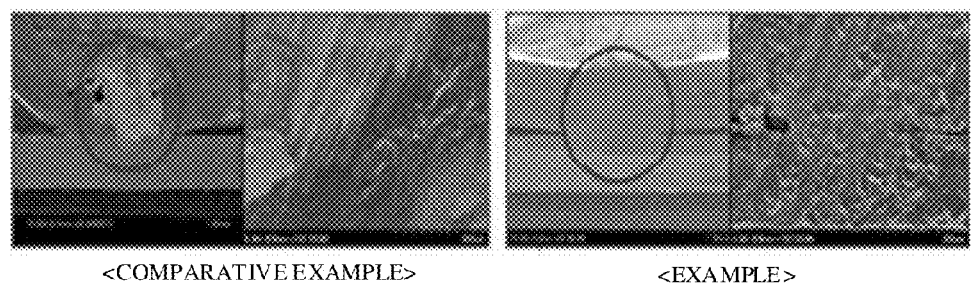
<COMPARATIVE EXAMPLE>          <EXAMPLE>

[FIG. 6]
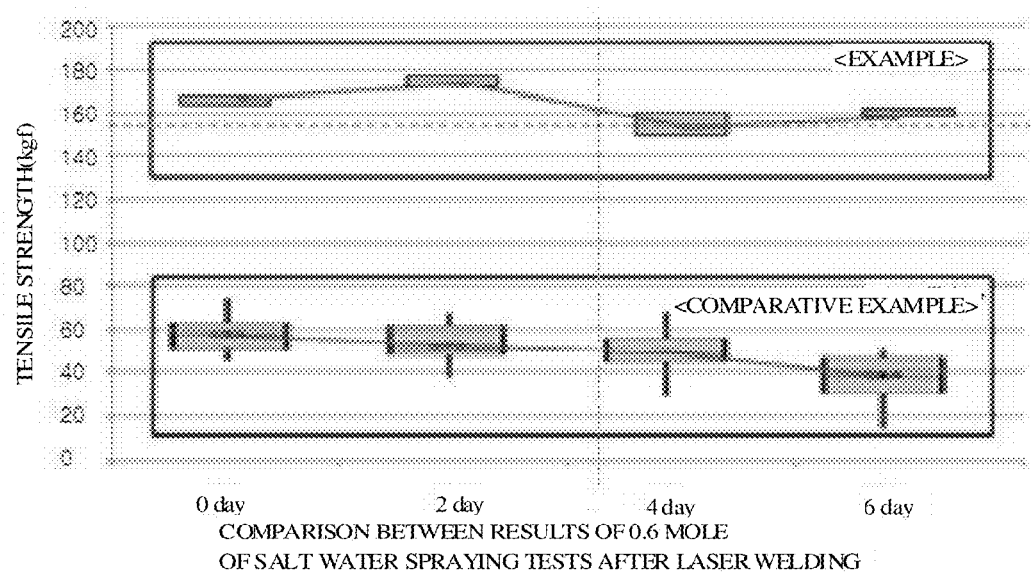
COMPARISON BETWEEN RESULTS OF 0.6 MOLE
OF SALT WATER SPRAYING TESTS AFTER LASER WELDING
[FIG. 7]
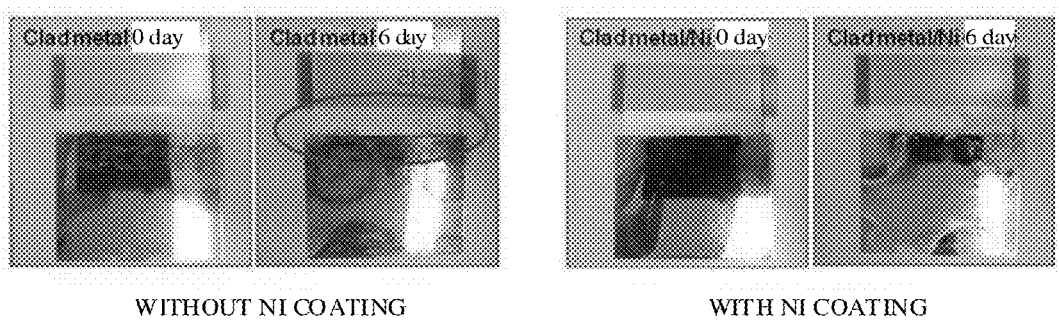
WITHOUT NI COATING                WITH NI COATING

BATTERY MODULE COMPRISING CONNECTING MEMBER COMPOSED OF DISSIMILAR METALS

This application is a National Stage Application of International Application No. PCT/KR2014/005992, filed Jul. 4, 2014, and claims the benefit of Korean Application No. 10-2013-0079240, filed Jul. 5, 2013, all of which are hereby incorporated by reference in their entirety for all purposes as if fully set forth herein.

TECHNICAL FIELD

The present invention relates to a battery module including a connecting member composed of dissimilar metals, and more particularly to a battery module including battery cells, electrode terminals of which are electrically connected to each other via a connecting member, wherein each of the battery cells is configured to have a structure in which an electrode assembly is mounted in a battery case made of a laminate sheet including a metal layer and a resin layer, and plate-shaped electrode terminals protrude from the battery case, the electrode terminals include a first electrode terminal and a second electrode terminal made of dissimilar metals, the connecting member includes a main connecting part, to which the first electrode terminal is welded, the main connecting part including the metal of the first electrode terminal, and a buried connecting part, to which the second electrode terminal is welded, the buried connecting part including the metal of the second electrode terminal, the buried connecting part is buried in the main connecting part in a state in which the buried connecting part is exposed at one surface of the main connecting part such that the buried connecting part has the same height as the main connecting part to form an even surface, and the first electrode terminal and the second electrode terminal are welded respectively to the main connecting part and the buried connecting part at one surface of the main connecting part at which the buried connecting part is exposed.

BACKGROUND ART

As mobile devices have been increasingly developed, and the demand for such mobile devices has increased, the demand for a secondary battery has also sharply increased as an energy source for the mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Depending upon the kind of external devices in which the secondary battery is used, the secondary battery may be used in the form of a single battery cell or in the form of a battery module having a plurality of unit cells electrically connected to each other. For example, small-sized devices, such as mobile phones, can be operated for a predetermined period of time with the output and capacity of one battery cell. On the other hand, a battery module needs to be used in middle or large-sized devices, such as laptop computers, portable digital versatile disc (DVD) players, small-sized personal computers (PC), electric vehicles, and hybrid electric vehicles, because high output and large capacity are necessary for the middle or large-sized devices.

The battery module includes a plurality of unit cells electrically connected in series and/or in parallel to each other.

In connection with this case, referring to FIGS. 1 and 2, it can be seen that in a case in which a positive electrode terminal and a negative electrode terminal are electrically connected to each other using a connecting member having a clad metal structure, processability is lowered.

Specifically, a clad metal type bus bar 100 is configured to have a structure in which an upper connecting part 102 made of aluminum is stacked on a lower connecting part 101 made of copper, and then the upper connecting part 102 and the lower connecting part 101 are rolled. Consequently, it is easy to weld a positive electrode lead 110 made of the same material as the upper connecting part 102, i.e. aluminum, to the clad metal type bus bar 100. In the same manner, it is easy to weld a negative electrode lead (not shown) made of the same material as the lower connecting part 101, i.e. copper, to the clad metal type bus bar 100.

In a case in which both a negative electrode lead 210 and a positive electrode lead 220 are welded to a clad metal type bus bar 200 as shown in FIG. 2, however, it is necessary to bend the clad metal type bus bar 200.

When the negative electrode lead 210 and the positive electrode lead 220 are welded to the clad metal type bus bar 200 in a state in which the clad metal type bus bar 200 is not bent, welding between the same copper materials or between the same aluminum materials are easily carried out. In a case in which welding between dissimilar metal materials is carried out, however, a brittle fracture occurs due to a dissimilar metal compound generated during welding with the result that the welded portions have low resistance to vibration.

In addition, it is necessary to perform an additional bending process as described above, whereby processability is lowered. Furthermore, welding of the dissimilar metals lowers safety of the battery module.

DISCLOSURE

Technical Problem

The present invention has been made to solve the above problems, and other technical problems that have yet to be resolved.

Therefore, it is an object of the present invention to provide a battery module wherein electrode terminals made of dissimilar metal materials are welded to a connecting member composed of dissimilar metal materials on the same plane without performing an additional bending process, thereby improving processability and achieving safety with no brittle fracture.

Technical Solution

In accordance with one aspect of the present invention, the above and other objects can be accomplished by the provision of a battery module including battery cells, electrode terminals of which are electrically connected to each other via a connecting member, wherein each of the battery cells is configured to have a structure in which an electrode assembly is mounted in a battery case made of a laminate sheet including a metal layer and a resin layer, and plate-shaped electrode terminals protrude from the battery case, the electrode terminals include a first electrode terminal and a second electrode terminal made of dissimilar metals, the connecting member includes a main connecting part, to which the first electrode terminal is welded, the main connecting part including the metal of the first electrode terminal, and a buried connecting part, to which the second electrode terminal is welded, the buried connecting part including the metal of the second electrode terminal, the buried connecting part is buried in the main connecting part in a state in which the buried connecting part is exposed at one surface of the main connecting part such that the buried connecting part has the same height as the main connecting part to form an even surface, and the first electrode terminal and the second electrode terminal are welded respectively to the main connecting part and the buried connecting part at one surface of the main connecting part at which the buried connecting part is exposed.

The battery case may be made of an aluminum laminate sheet.

In a case in which the pouch-shaped battery cells are electrically connected to each other, particularly in series, the connecting member according to the present invention is used for electrical connection between the positive electrode terminal and the negative electrode terminal, thereby improving processability.

Specifically, the connecting member may include a main connecting part, to which the first electrode terminal is welded, the main connecting part including the metal of the first electrode terminal, and a buried connecting part, to which the second electrode terminal is welded, the buried connecting part including the metal of the second electrode terminal, the buried connecting part may be buried in the main connecting part in a state in which the buried connecting part is exposed at one surface of the main connecting part.

As a result, the first electrode terminal and the second electrode terminal may be welded respectively to the main connecting part and the buried connecting part at one surface of the main connecting part at which the buried connecting part is exposed, and the first electrode terminal and the second electrode terminal may be located on the same plane, and the connecting member may be welded to the electrode terminals in the same direction.

In connection with this case, referring to FIG. 2, in a case in which both the negative electrode lead and the positive electrode lead are welded to the conventional clad metal type bus bar, it is necessary to bend the connecting member such that the negative electrode lead is located at the upper end of the clad metal type bus bar, and the positive electrode lead is located at the lower end of the clad metal type bus bar. According to the present invention, however, it is possible to solve this problem.

In a concrete example, the first electrode terminal and the second electrode terminal according to the present invention may be made of dissimilar metal materials selected from a group consisting of Al, Cu, Ni, Fe, and an alloy of two or more thereof. In this case, the main connecting part may include a metal material corresponding to the first electrode terminal, and the buried connecting part may include a metal material corresponding to the second electrode terminal.

In a specific embodiment of the present invention, the main connecting part may include Cu in a case in which the first electrode terminal includes Cu, and the buried connecting part may include Al in a case in which the second electrode terminal includes Al.

In another specific embodiment of the present invention, the main connecting part may include Al in a case in which the first electrode terminal includes Al, and the buried connecting part may include Cu in a case in which the second electrode terminal includes Cu.

The connecting member may be any one selected from a group consisting of a metal plate, a bus bar, and a wire. The connecting member may be manufactured by performing shape rolling on the metal surface of the main connecting part to form a groove, treating the surface of the main connecting part using plasma, inserting the metal material of the buried connecting part into the groove formed at the main connecting part under EPC control, and rolling the main connecting part and the buried connecting part.

In addition, in a concrete example, the connecting member may be coated with Zn or Ni. In a case in which dissimilar metals contact each other, resistance to corrosion due to contact of the dissimilar metals may be lowered with the result that it is difficult to apply the connecting member to a device which may have a possibility of corrosion. In a case in which the connecting member is coated with Zn or Ni as described above, a dissimilar metal compound is hardly generated during welding of the dissimilar metals, and corrosion due to contact of the dissimilar metals may be considerably reduced, which is further preferable.

Meanwhile, the welding between the electrode terminals and the connecting member may be any one selected from a group consisting of resistance welding, laser welding, arc welding, ultrasonic welding, E-beam welding, and hybrid welding. Specifically, the welding may be ultrasonic welding or hybrid welding.

The ultrasonic welding may be performed using an ultrasonic vibration of 20 KHz to 60 KHz. The laser welding may be performed using continuous wave (CW) laser having a laser energy density of 250 kJ/cm$^2$ to 1 MJ/cm$^2$ and an optical system at a welding speed of 50 to 200 mm/s. Specifically, the laser welding may be performed using CW laser having a laser energy density of 300 kJ/cm$^2$ to 500 kJ/cm$^2$ and an optical system at a welding speed of 80 to 120 mm/s. In addition, in a case in which the welding is performed using CW laser, laser oscillation may be modulated such that the laser has a predetermined frequency so as to prevent thermal damage to a welding material due to heat continuously exposed to the welding material. In this case, the modulation frequency may be 100 Hz to 1 kHz, and a laser oscillation rate during modulation may be 30% to 90% the modulation frequency. This means that, for example, in a case in which a laser oscillation rate is 50% at 1 kHz modulation, laser output modulation is carried out at intervals of 1 ms such that laser oscillation is carried out for 500 μs, and laser oscillation is not carried out for 500 μs, which is repeated.

In accordance with another aspect of the present invention, there is provided a device including the battery module with the above-stated construction as a power source. The device may be a smart pad, a lap top computer, an electric automobile, such as an electric vehicle (EV), a hybrid electric vehicle (HEV), or a plug-in hybrid electric vehicle (PHEV), or a power storage device. However, the present invention is not limited thereto.

The structures and manufacturing methods of the battery module and the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a view typically showing a process of welding a positive electrode terminal to a conventional clad metal type bus bar;

FIG. 2 is a view typically showing a process of welding a positive electrode terminal and a negative electrode terminal to the bus bar of FIG. 1;

FIG. 3 is a view typically showing a process of welding a positive electrode terminal and a negative electrode terminal to a bus bar according to a specific embodiment of the present invention;

FIG. 4 is a typical view showing a connecting member according to the present invention which is coated;

FIG. 5 is a scanning electron microscope (SEM) photograph showing whether a dissimilar metal compound has been generated after laser welding of connecting members according to experimental example 1 of the present invention;

FIG. 6 is a graph showing results of tensile strength and salt water spraying corrosion tests of a connecting member according to experimental example 2 of the present invention; and FIG. 7 is a photograph showing a degree of corrosion caused by contact of dissimilar metals according to experimental example 3 of the present invention.

BEST MODE

Now, exemplary embodiments of the present invention will be described in detail with reference to the accompanying drawings. It should be noted, however, that the scope of the present invention is not limited by the illustrated embodiments.

The drawings show only parts of a battery and a battery module related to welding, and other components of the battery and the battery module are omitted from the drawings.

FIG. 3 is a view typically showing a process of welding terminals to a connecting member according to the present invention.

Referring to FIG. 3, a connecting member 300 includes a main connecting part 301 made of a copper material and a buried connecting part 302 made of an aluminum material. The buried connecting part 302 is buried in the main connecting part 301 in a state in which the buried connecting part 302 is exposed at one surface of the main connecting part 301.

A negative electrode lead 310 is made of the same material as the main connecting part 301 of the connecting member 300, i.e. copper, and a positive electrode lead 320 is made of the same material as the buried connecting part 302 of the connecting member 300, i.e. aluminum.

When a plurality of battery cells is electrically connected to each other via the connecting member 300, a negative electrode lead 310 of one of the battery cells (not shown) is located on one surface of the main connecting part 301 of the connecting member 300, and a positive electrode lead 320 of an adjacent one of the battery cells (not shown) is located on the buried connecting part 302 is exposed at one surface of the main connecting part 301 of the connecting member 300. Subsequently, laser 330 is applied to the negative electrode lead 310 and the positive electrode lead 320 to perform welding between the main connecting part 301 and the negative electrode lead 310 and welding between the buried connecting part 302 and the positive electrode lead 320.

Consequently, the negative electrode lead 310 and the positive electrode lead 320 may be connected to the connecting member 300 on the same plane without reduction of safety.

In addition, processability is considerably improved as compared with the conventional battery module of FIG. 2 in which the negative electrode lead 210 is one surface, i.e. the upper end, of the bus bar 200, and the positive electrode lead 220 is the other surface, i.e. the lower end, of the bus bar 200, and then laser 230 is applied to perform welding therebetween.

FIG. 4 is a view showing a connecting member 400 according to the present invention which is coated with Ni.

Referring to FIG. 4, the connecting member 400 includes a main connecting part 401 made of a copper material and a buried connecting part 402 made of an aluminum material. The buried connecting part 402 is buried in the main connecting part 401 in a state in which the buried connecting part 402 is exposed at one surface of the main connecting part 401. The connecting member 400 is provided at the surface thereof with a coating layer 410 made of Ni. In this structure, corrosion caused by contact of dissimilar metals is considerably reduced, which is preferable.

Hereinafter, the present invention will be described in more detail with reference to the following examples. These examples are provided only for illustration of the present invention and should not be construed as limiting the scope of the present invention.

Experimental Example 1

A negative electrode lead made of a copper material and a positive electrode lead made of an aluminum material were welded to a connecting member (comparative example) made of copper and the connecting member (example) according to the present invention shown in FIG. 3 by laser welding. At this time, in a case in which the connecting member according to the present invention was welded, the negative electrode lead made of the copper material was welded to the main connecting part made of the copper material, and the positive electrode lead made of the aluminum material was welded to the buried connecting part made of the aluminum material. Sections of the welded portions of the positive electrode leads were photographed using an electron microscope to determine whether a dissimilar metal compound had been generated. The electron microscope photographs are shown in FIG. 5.

Referring to FIG. 5, it can be seen that in a case in which the connecting member made of copper was used, a dissimilar metal compound was generated during welding between the connecting member made of copper and the positive electrode lead made of the aluminum material. On the other hand, it can be seen that in a case in which the connecting member according to the present invention was used, the same kind of metals were connected to each other, whereby no dissimilar metal compound was generated.

Experimental Example 2

For welded portions between the connecting members, to which the positive electrode leads and the negative electrode leads were welded according to experimental example 1, and the positive electrode leads, tensile strength was measured, and 0.6 mole of salt water spraying corrosion tests were carried out. The results are shown in FIG. 6.

Referring to FIG. 6, it can be seen that for the connecting member according to the present invention, initial tensile strength was high, and the tensile strength was not greatly reduced after salt water spraying corrosion. On the other hand, it can be seen that for the connecting member made of copper, to which the dissimilar metals were welded, initial tensile strength was low, and the tensile strength was greatly reduced after salt water spraying corrosion.

Experimental Example 3

In order to measure a degree of corrosion caused by contact of the dissimilar metals, 0.6 mole of salt water was continuously sprayed to the connecting member according to the present invention shown in FIG. 3 and the connecting member according to the present invention shown in FIG. 4, and it was determined whether the connecting members had been corroded after 6 days. The results are shown in FIG. 7.

Referring to FIG. 7, it can be seen that for the connecting member not coated with Ni or Zn, small corroded holes were generated at a contact portion between Al and Cu due to contact corrosion. On the other hand, it can be seen that the connecting member coated with Ni or Zn was little corroded.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

EXPLANATION OF REFERENCE NUMERALS AND SYMBOLS 100, 200: Clad metal type bus bar
101, 201: Lower connecting part
102, 202: Upper connecting part
110, 220, 320: Positive electrode lead
120, 230, 330: Laser
210, 310: Negative electrode lead
300, 400: Connecting member
301, 401: Main connecting part
302, 402: Buried connecting part
410: Coating layer

INDUSTRIAL APPLICABILITY

As is apparent from the above description, a battery module according to the present invention uses a connecting member including a main connecting part including a metal material constituting a first electrode terminal and a buried connecting part including a metal material constituting a second electrode terminal, the buried connecting part being buried in the main connecting part in a state in which the buried connecting part is exposed at one surface of the main connecting part. Consequently, it is possible to perform welding of the electrode terminals to the connecting member without performing an additional bending process for electrical connection between the electrode terminals, particularly for series connection between the electrode terminals, unlike in the conventional art, thereby improving processability. As a result, manufacturing cost is reduced, thereby improving price competitiveness.

In addition, it is possible to prevent the occurrence of a brittle fracture caused by welding of dissimilar metals and to prevent the reduction in mechanical characteristics of welded portions and the increase in resistance of the welded portions, thereby improving safety of the battery module.

The invention claimed is:

1. A battery module comprising battery cells, electrode terminals of which are electrically connected to each other via a connecting member, wherein each of the battery cells is configured to have a structure in which an electrode assembly is mounted in a battery case made of a laminate sheet comprising a metal layer and a resin layer, and plate-shaped electrode terminals protrude from the battery case, the electrode terminals comprise a first electrode terminal and a second electrode terminal made of dissimilar metals, the connecting member comprises a main connecting part, to which the first electrode terminal is welded, the main connecting part comprising the metal of the first electrode terminal, and a buried connecting part, to which the second electrode terminal is welded, the buried connecting part comprising the metal of the second electrode terminal, the buried connecting part is buried in the main connecting part in a state in which the buried connecting part is exposed at only one surface of the main connecting part such that the buried connecting part has the same height as the main connecting part to form an even surface, and the first electrode terminal and the second electrode terminal are welded respectively to the main connecting part and the buried connecting part at one surface of the main connecting part at which the buried connecting part is exposed.

2. The battery module according to claim 1, wherein the battery case is made of an aluminum laminate sheet.

3. The battery module according to claim 1, wherein the first electrode terminal and the second electrode terminal are made of dissimilar metal materials selected from a group consisting of Al, Cu, Ni, Fe, and an alloy of two or more thereof.

4. The battery module according to claim 1, wherein the main connecting part comprises Cu, and the buried connecting part comprises Al.

5. The battery module according to claim 1, wherein the main connecting part comprises Al, and the buried connecting part comprises Cu.

6. The battery module according to claim 1, wherein the first electrode terminal and the second electrode terminal are located on the same plane, and the connecting member is welded to the electrode terminals in the same direction.

7. The battery module according to claim 1, wherein the connecting member is any one selected from a group consisting of a metal plate, a bus bar, and a wire.

8. The battery module according to claim 1, wherein the connecting member is coated with Zn or Ni.

9. The battery module according to claim 1, wherein the welding is any one selected from a group consisting of resistance welding, laser welding, arc welding, ultrasonic welding, E-beam welding, and hybrid welding.

10. A wireless device using a battery module according to claim 1 as a power source.

11. A device using a battery module according to claim 1 as a power source.

12. The device according to claim 11, wherein the device is a smart pad or a laptop computer.

13. The device according to claim 11, wherein the device is an electric vehicle, a hybrid electric vehicle, a plug-in hybrid electric vehicle, or a power storage system.

* * * * *